United States Patent
Hatashita et al.

(10) Patent No.: US 8,811,361 B2
(45) Date of Patent: Aug. 19, 2014

(54) HYBRID BROADCAST PACKET REPLICATION FOR VIRTUAL LOCAL AREA NETWORKS

(75) Inventors: Jason D. Hatashita, Auburn, CA (US); Puneet Butta, San Jose, CA (US); Helge Szwerinski, Cupertino, CA (US); Jacob Thomas, San Jose, CA (US)

(73) Assignee: Motorola Solutions, Inc., Schaumburg, IL (US)

( * ) Notice: Subject to any disclaimer, the term of this patent is extended or adjusted under 35 U.S.C. 154(b) by 402 days.

(21) Appl. No.: 13/219,021

(22) Filed: Aug. 26, 2011

(65) Prior Publication Data

US 2013/0051376 A1    Feb. 28, 2013

(51) Int. Cl.
*H04W 4/00* (2009.01)
*H04W 4/02* (2009.01)

(52) U.S. Cl.
CPC .. *H04W 4/00* (2013.01); *H04W 4/02* (2013.01)
USPC ........... 370/338; 370/310; 370/328; 370/351; 370/389; 370/390; 370/392

(58) Field of Classification Search
None
See application file for complete search history.

(56) References Cited

U.S. PATENT DOCUMENTS

| | | | |
|---|---|---|---|
| 2003/0035398 A1* | 2/2003 | Sato | 370/338 |
| 2004/0109452 A1* | 6/2004 | Takihiro et al. | 370/392 |
| 2006/0072584 A1* | 4/2006 | Goto et al. | 370/395.53 |
| 2007/0058535 A1* | 3/2007 | Bichot et al. | 370/230 |
| 2007/0076612 A1* | 4/2007 | Iyer et al. | 370/235 |
| 2008/0069024 A1* | 3/2008 | Iino | 370/313 |
| 2008/0186981 A1* | 8/2008 | Seto et al. | 370/395.53 |
| 2008/0304456 A1* | 12/2008 | Iino et al. | 370/338 |
| 2009/0034470 A1* | 2/2009 | Nagarajan et al. | 370/331 |

* cited by examiner

*Primary Examiner* — Hassan Phillips
*Assistant Examiner* — Gautam Sharma
(74) *Attorney, Agent, or Firm* — Brian M. Mancini

(57) ABSTRACT

A system for hybrid broadcast packet replication for virtual local area networks includes a switch operable to receive a packet with an associated VLAN identifier and replicate the packet. A VLAN bit mask is included in the switch to filter the target destinations for the sending the replicated packets. The mask has a first level that provides to the switch an indication of a VLAN group where a radio of an AP has an associated client device. The mask has a second level where the mask provides to the switch an indication of a WLAN where a radio of an AP has an associated client device. The mask can have a third level where the mask provides to the switch an indication of a list of VLANs in use by each WLAN. The switch can then send those replicated packets filtered through the mask on to target devices of the identified VLAN.

12 Claims, 2 Drawing Sheets

HYBRID BROADCAST PACKET REPLICATION FOR VIRTUAL LOCAL AREA NETWORKS

FIELD OF THE DISCLOSURE

The present invention relates generally to virtual local area networks and more particularly to a hybrid technique for broadcast packet replication for virtual local area networks.

BACKGROUND

A wireless switched local area network (WLAN) utilizes a switch to transmit data between various network components. The switch may be capable of inspecting data packets as they are received, determining the source and destination device of each packet, and forwarding the packet appropriately. For example, a switch can send a broadcast packet to all the access points (APs) under its control to be broadcast to multiple client devices associated with those access points. The more access points used, the wider amount of area the network can cover. However, access points come in different configurations, some of which are more expensive, e.g. a "fat" access point with its own internal intelligent processing components, versus a lower cost "thin" access point (or access port) which only serves to transfer packets. Thus, thin access points may be used to provide a low cost way to extend an operating coverage area of the network. However, thin access points are equipped with less intelligent components than conventional access points, and therefore the switch must be able to perform the intelligence to make sure that packets are properly delivered to particular devices, such as devices associated in a virtual local area network (VLAN). In addition, since thin access points are low cost, they could be deployed in large numbers, and the switch will need to manage all of these many thin access points.

A VLAN is a logical subset of devices in one or more WLAN. Each wireless LAN may be divided into multiple VLANs. In addition, one VLAN can extend over multiple WLANs. In one example, it may be desirable to communicate with a particular logical group of mobile devices. In this case, a VLAN can be set up with those devices as members of the group. Packets addressed to members of this group can have an associated field with an identification or tag of the VLAN contained therein. Ideally, packets with this VLAN identification will only be exchanged with members of the VLAN group. However, where a large number of thin APs are used, and multiple VLANs need to be considered, the switch is required to manage all these AP, WLAN and VLAN combinations, which requires considerable resources in the switch and messaging overhead in the air interface.

Accordingly, what is needed is a technique for a network switch to manage WLANs having many thin APs and covering multiple VLANs. It would also be of benefit to mitigate the replication of unneeded broadcast packets.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
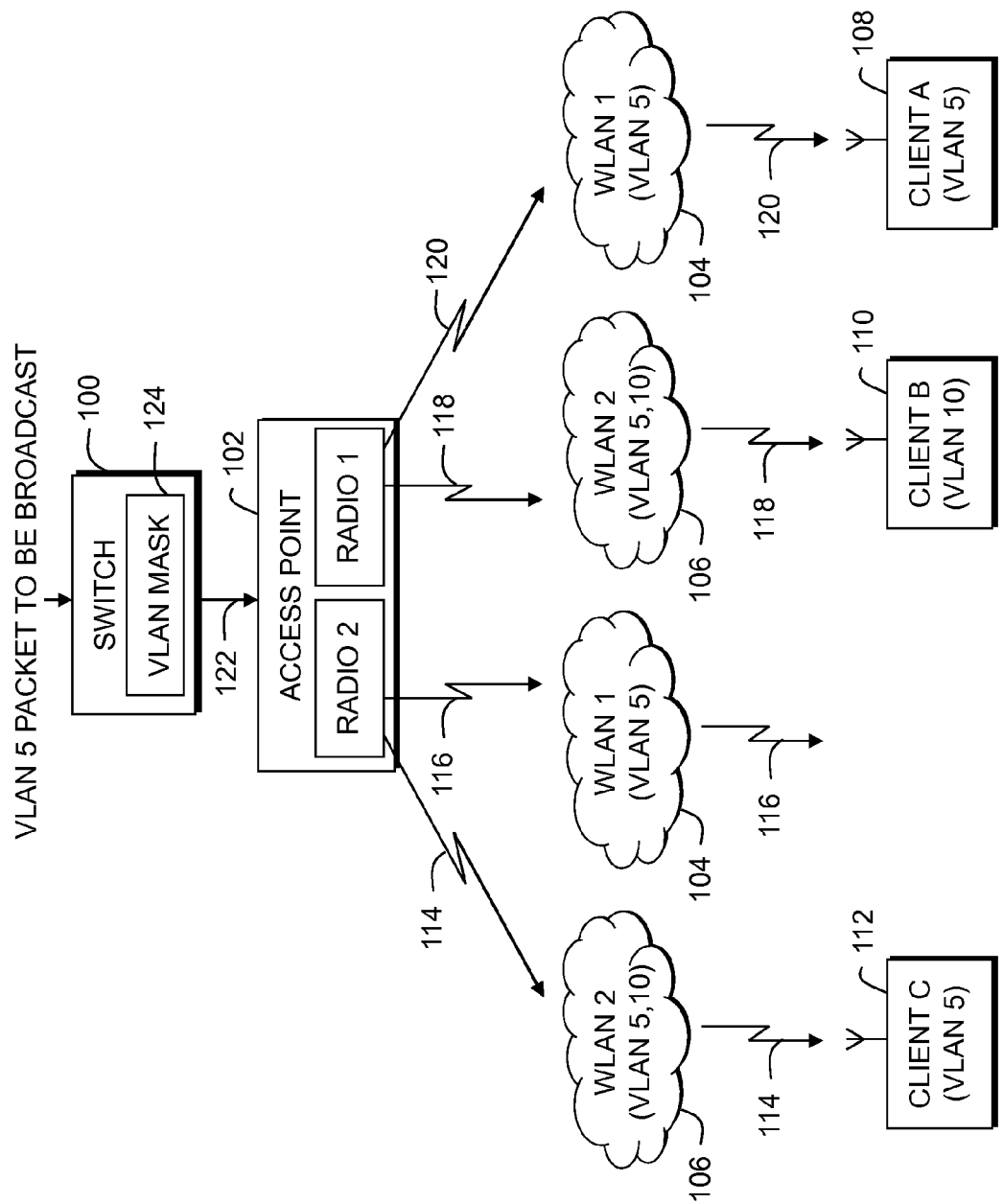
FIG. 1 is a simplified block view of an apparatus, in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention provides a novel technique for a wireless network switch to manage multiple wireless local area networks (WLANs) having many "thin" access points or ports (APs) and covering multiple virtual LANs (VLANs). The present invention is also able to mitigate the replication of unneeded broadcast packets. The exemplary embodiments of the present invention describe a system and method for broadcasting packets from a wireless switch on a network including multiple WLANs and multiple VLANs. In particular, the exemplary embodiments of the present invention provide a switch coupled to multiple thin APs divided into at least one VLAN and serving a number of client devices. The WLANs including the wireless switch, VLANs, the APs, and the client devices will be described in detail below.

FIG. 1 is a simplified block diagram of various embodiments of the present invention. Wireless switched LANs (WLANs) are shown. The WLANs includes a wireless switch 100 modified in accordance with the present invention. The switch is coupled to a thin access point 102. Although only one access point (AP) is shown, it should be recognized that the switch can be coupled to many APs. The thin access points service any number of client devices 108-112. It should be recognized that the client devices can move from the service area of one AP to the service area of another AP, and that the switch can keep track of, and manage, this movement.

In practice, it is envisioned that the switch is one of Motorola Solutions, Inc. WiNG5™ switch products such as models RFS4000, RFS6000, and RFS7000 operable on a IEEE 802.11 protocol and capable of supporting a thin access port such as Motorola Solutions, Inc. AP300™ access port, or any original equipment manufacture products capable of supporting both WiNG5™ and AP300™ products. AP300™ access ports contain two radio sections (as shown) that can operate on two different frequency bands of 2.4 GHz and 5.2 GHz. In addition, each access port can support four BSSIDs (Basic Service Set Identifiers) and sixteen ESSIDs (Extended Service Set Identifiers) per radio, enabling granular segmentation into multiple WLANs and VLANs.

According to the exemplary embodiments of the present invention, multiple VLANs may exist within the one or more WLANs. A VLAN can also include a portion of an overall wide area network (WAN) in which the WLANs are included. The VLAN can include a variety of components that may be selected by a variety of conditions. For example, the VLAN can include a set of components based on a location. Thus, the components may be localized in an area. In another example, the VLAN can include a set of components based on time. Thus, the components may be determined based on when the device was introduced into the network. In yet another example, the VLAN can include a set of components based on an available connectivity. Thus, the components may be selected based on a location and/or operating area of other components.

As illustrated, the AP 102 is connected to the switch 100. Each AP can communicate with the switch using a wireless connection 122. Those skilled in the art will understand that the physical connection between an AP and the switch can be either via a WAN port or a LAN port. The APs are responsible for distribution of broadcast data packets for the VLANs. As a wireless switched network, APs can wirelessly communicate with the client devices using one or more WLANs 104, 106. APs can also be connected to other APs (not shown) using a wired and/or wireless connection to form a mesh network. This connection may be a local data path so that data may be transmitted within the VLAN. In the example shown, AP 102 can wirelessly communicate with client devices 108-112 using either WLAN 1 104 or WLAN 2 106. In this example, AP uses its radio 1 to communicate 120 with client A 108 over WLAN 1 104 where client A is a member of VLAN group 5. AP also uses its radio 1 to communicate 118 with client B 110 over WLAN 2 106 where client B is a member of VLAN group 10. AP uses its radio 2 to communicate 114 with client C 112 over WLAN 2 106 where client C is a member of VLAN group 5.

AP 102 can include a separate control path (not shown) to the switch 100. The control paths can be used for transmitting and/or receiving IEEE 802.11 protocol control packets, which can include secure configuration information, statistics data, and performance information. In addition, each AP 102 can include a data path 122 to the switch 100. Each data path is responsible for distributing broadcast data to the components of the VLAN.

For efficiency, it is desired to send broadcast data packets to only those client devices belonging to a VLAN group indicated for that packet. For an AP operable on more than one WLAN or having more than one radio, an incoming broadcast packet to an IEEE 802.11 AP must be replicated and transmitted on each WLAN and radio. Ideally, a broadcast packet should only be sent on WLANs that contain an associated client device of a VLAN matching the VLAN identity of the incoming broadcast packet. This wastes as little air bandwidth as possible. In order to provide this efficiency, a VLAN identity tag is included with the broadcast data packet. The switch can then use a VLAN bit mask to identify which packets have this VLAN identity tag in order to limit needless replications and transmissions.

Ideally, the VLAN bit masks required to properly limit broadcast replications would be a bit mask of all possible VLANs for each possible WLAN on each radio. A VLAN bit mask is a 512 byte structure (1 bit per 4096 possible VLANs). In the case of the Motorola Solutions, Inc. WiNG5™ architecture, this equates to sixteen VLAN bit masks per radio or eight kilobytes worth of data structures per radio. In a standard "fat" AP architecture, there are few radios and the bit mask size is not a critical resource. However, in a thin AP architecture, for example using many Motorola Solutions, Inc. AP300™ access ports, requires those data structures to be present and managed on the switch, which would need to support the many thin APs. For example, the Motorola Solutions, Inc. RFS7000™ switch can adopt 512 AP300 access ports, each of which contains two radios. Using the simple data structure layout describes above, that equates to 2*512*8 k=8192 kilobytes, which is a significant amount of memory to dedicate on these platforms.

To preserve memory on platforms that support thin APs, such as the RFS7000™ switch supporting AP300™ access points, the present invention incorporates a novel VLAN hybrid bit mask. This hybrid approach uses smaller data structures than that of a standard AP architecture. In particular, the present invention reduces the memory requirement for the VLAN bit masks from 8 kilobytes per radio to 2.25 kilobytes per radio, which improves performance and increases the number of devices and features that can be supported. In operation, the reduced mask size of present invention sometimes results in the replication and sending of an unneeded packet, but is configured such that the cases where unneeded packets are replicated and sent are the result of only unusual configurations that are not encountered often, as will be detailed below.

In the simplest embodiment, the switch 100 will have a VLAN bit mask for each VLAN present on each WLAN. In the example shown in FIG. 1, the bit mask indicates that there is VLAN group 5 on WLANs 1 and 2, and that VLAN group 10 is on WLAN 2. Upon receiving a packet to be broadcast to VLAN group 5, the switch will replicate the broadcast packet, based on the VLAN bit mask, for both WLAN 1 and 2 which is supplied to both radio (that support WLANs 1 and 2). The radios will then broadcast 114-120 the replicated packets. This embodiment does not require a map of any client devices, but only on which WLAN the target VLAN group is located. As a result, this embodiment sends out the most number of replicated packets, even sending out 116 the packet on radio 2 to WLAN 1 104 to no client device, and on radio 1 to WLAN 2 106 to a client device 110 that is not part of VLAN 5 and will not accept the packet.

In an ideal embodiment, the switch 100 will not only have a bit mask for each VLAN present on each WLAN, but also where the client devices are on each radio. In the example shown in FIG. 1, the bit mask indicates that there is VLAN group 5 on WLANs 1 and 2, and that client A 108 of VLAN group 5 is being served by radio 1 on WLAN 1, and that client C 112 of VLAN group 5 is being served by radio 2 on WLAN 2. Upon receiving a packet to be broadcast to VLAN group 5, the switch will replicate the broadcast packet for WLAN 1 104 on radio 1 and WLAN 2 106 on radio 2. The radios will then broadcast 120, 114 the packets on radios 1 and 2, respectively. This embodiment requires a map of client devices, as well as which WLAN the target VLAN group is located. As a result, this embodiment sends out the least number of replicated packets, sending packets 120, 114 to the correct target devices 108, 112 only.

The present invention provides a hybrid embodiment of a VLAN bit mask 124 with three levels of masking. The mask will filter the destinations for the sending of the replicated packets using the mask. At a first level, the mask provides to the switch an indication of a VLAN group where a radio of an AP has an associated client device. This first level indication is provided per radio and uses the VLAN bit mask such that a bit that is set ON shows that there is at least one client in that VLAN group that is being served by that radio. At a second level, the mask provides to the switch an indication of a WLAN where a radio of an AP has an associated client device. This second level is in effect a WLAN mask that lists all WLANs and provides a bit that is set ON if there is a client on a particular radio serving that WLAN. At a third level, the mask provides to the switch an indication of a list of VLANs in use by each WLAN. In the above levels, one bit of the mask is set ON or OFF for each of these three levels.

Therefore, in the example shown in FIG. 1, the VLAN bit mask of the hybrid embodiment first indicates that VLAN group 5 has clients on both radios 1 and 2, and that VLAN group 10 has a client on radio 1. In this example, the first level filters none of the packets since VLAN 5 components are on both radios. The hybrid embodiment secondly indicates that there is a client on WLAN 1 using radio 1, and clients on WLAN 2 using radios 1 and 2. In this example, the second level filters any packets from going to WLAN 1 on radio 2 since there are no clients there. The hybrid embodiment thirdly indicates that VLAN group 5 is being served by both WLANs 1 and 2, and that VLAN group 10 is being served by radio 1 on WLAN 2. In this example, the third level does not filter the packets any further, and the packets will be broadcast 120, 118, 114 respectively to client A 108, client B 110, and client C 112 even though the packet sent 118 to client B 110 is unneeded and will not be accepted by that client.

This hybrid embodiment does not require a map of client devices, which is similar to the advantage of the simplest embodiment by saving memory that otherwise would be needed to map all clients. The hybrid embodiment also does not send 116 packets to devices that are not present, which was a problem of the simplest embodiment, and thereby saves messaging overhead. As can be seen, this hybrid embodiment may send out some unneeded packets (e.g. to client B 118 which is not part of VLAN group 5) under certain uncommon circumstances. In particular, the sending 118 of the unnecessary packet is the result of VLAN group 5 overlapping both WLANs 1 and 2, where two WLANs will get packets for same VLAN, which is not a normal circumstance since it is more typical that VLANs do not overlap between WLANs. In the above example, if WLAN 2 only supported VLAN 10, then packets would only be sent properly to clients A and C.

It should be noted that a plurality of client devices may be disposed in each of the VLANs and that these client devices can be mobile. As a result, the client devices can be connected to any of the APs, and each AP can forward the packet to any client device connected thereto. The switch knows the VLAN group of each client device, and manages where each client device is located in the WLAN, i.e. which AP and radio is serving which client device. Accordingly, the switch will know where to direct packets for a particular VLAN.

As used herein, the switch, APs, and client devices, can comprise basic components such as, but not limited to, microprocessors, digital signal processors, microcontrollers, computers, drivers, memory devices, application-specific integrated circuits, and/or logic circuitry. Such devices are typically adapted to implement algorithms and/or protocols that have been expressed using high-level design languages or descriptions, expressed using computer instructions, expressed using messaging/signaling flow diagrams, and/or expressed using logic flow diagrams. Thus, given an algorithm or logic flow, those skilled in the art are aware of the many design and development techniques available to implement user equipment that performs the given logic. Therefore, the processor represents a known apparatus that has been adapted, in accordance with the description herein, to implement various embodiments of the present invention.

Figure 2:
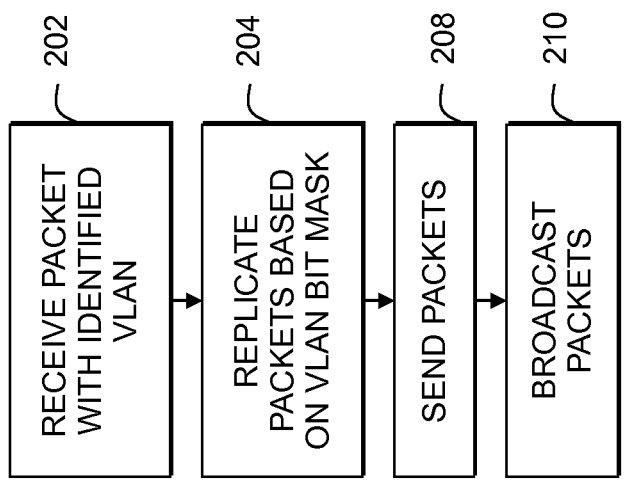
FIG. 2 is a simplified flow diagram demonstrating a method, in accordance with the present invention.

FIG. 2 illustrates a flowchart of a method for hybrid broadcast packet replication for virtual local area networks, in accordance with the present invention.

The method starts by receiving 202 a packet with an associated VLAN identifier, wherein the packet is to be broadcast to at least one target device grouped in the identified VLAN.

A next step includes replicating 204 the packet based on the destinations for the sending of the replicated packets using a VLAN bit mask. If the mask indicates multiple destinations requiring replication and sending of the packet, then the packet will be replicated. The mask has a first level filter that provides an indication of a VLAN group where a radio of an AP has an associated client device. The mask also has a second level filter where the mask provides an indication of a WLAN where a radio of an AP has an associated client device. The mask can also have a third level where the mask provides an indication of a list of VLANs in use by each WLAN. The mask reduces memory space by setting one bit for each of the level filters. This step can also include providing a VLAN bit mask for each VLAN being served on each WLAN.

A next step includes sending 208 those replicated packets filtered through the mask on to the at least one target device of the identified VLAN.

A next step includes broadcasting 210 those replicated packets filtered through the mask to the at least one target device of the identified VLAN.

Advantageously, the present invention provides a system that allows reduces VLAN bit masks size when thin AP architectures are used in a LAN, which improves performance and increases the number of devices and features that can be supported.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system for hybrid broadcast packet replication for virtual local area networks, comprising:
    a switch disposed within at least one wireless local area network (WLAN), the at least one wireless local area network comprising at least one virtual local area network (VLAN), the switch operable to receive a packet with an associated VLAN identifier, wherein the packet is to be broadcast to at least one target device grouped in the identified VLAN, the switch also operable to replicate the packet, and
    a VLAN bit mask included in the switch, the VLAN bit mask operable to filter the destinations for the sending of the replicated packets using the mask, wherein;
        the mask has a first level that provides to the switch an indication of a VLAN group where a radio of an access port (AP) has an associated client device wherein the first level indication is provided per radio, and
        the mask has a second level where the mask provides to the switch an indication of a WLAN where a radio of an AP has an associated client device; and wherein
    the switch is further operable to replicate packets based on the mask and send those replicated packets filtered through the mask on to the at least one target device of the identified VLAN.

2. The system of claim 1, wherein an identified VLAN exists on more than one WLAN.

3. The system of claim 1, wherein the mask has a third level where the mask provides to the switch an indication of a list of VLANs in use by each of a plurality of WLANs.

4. The system of claim 1, wherein the mask sets one bit for each of the levels.

5. The system of claim 1, wherein a VLAN bit mask is provided for each VLAN being served on each of a plurality of WLANs.

6. The system of claim 1, further comprising an access point radio operable to broadcast those replicated packets filtered through the mask to the at least one target device of the identified VLAN.

7. A method for hybrid broadcast packet replication for virtual local area networks, the method comprising the steps of:
    receiving a packet with an associated virtual local area network (VLAN) identifier, wherein the packet is to be broadcast to at least one target device grouped in the identified VLAN;
    replicating the packet based on the destinations for the sending of the replicated packets using a VLAN bit mask, wherein the mask has a first level that provides an indication of a VLAN group where a radio of an access port (AP) has an associated client device wherein the first level indication is provided per radio, and a second level where the mask provides an indication of a wireless local area network (WLAN) where a radio of an AP has an associated client device; and
    sending those replicated packets filtered through the mask on to the at least one target device of the identified VLAN.

8. The method of claim 7, wherein the replicating step includes the mask having a third level where the mask provides an indication of a list of VLANs in use by each WLAN.

9. The method of claim 7, wherein the replicating step includes the mask setting one bit for each of the levels.

10. The method of claim 7, wherein the replicating step includes providing a VLAN bit mask for each VLAN being served on each of a plurality of WLANs.

11. The method of claim 7, further comprising broadcasting those replicated packets filtered through the mask to the at least one target device of the identified VLAN.

12. A wireless network switch for hybrid broadcast packet replication for virtual local area networks, wherein the switch is disposed within at least one wireless local area network (WLAN) comprising at least one virtual local area network (VLAN), the wireless network switch comprising:
    a processor operable to receive a packet with an associated VLAN identifier, wherein the packet is to be broadcast to at least one target device grouped in the identified VLAN, the processor is also operable to replicate the packet, and
    a VLAN bit mask included in the processor, the VLAN bit mask operable to filter the destinations for the sending of the replicated packets using the mask, wherein;
        the mask has a first level that provides to the switch an indication of a VLAN group where a radio of an access port (AP) has an associated client device wherein the first level indication is provided per radio, and the mask has a second level where the mask provides to the switch an indication of a WLAN where a radio of an AP has an associated client device; and wherein the processor is further operable to replicate packets based on the mask send those replicated packets filtered through the mask on to the at least one target device of the identified VLAN.

\* \* \* \* \*